(12) United States Patent
Yerli (10) Patent No.: US 12,108,118 B2
(45) Date of Patent: Oct. 1, 2024

(54) SYSTEM AND METHOD FOR CONTROLLING USER INTERACTIONS IN VIRTUAL MEETING TO ENABLE SELECTIVE PAUSING

(71) Applicant: TMRW Foundation IP SARL, Luxembourg (LU)

(72) Inventor: Cevat Yerli, Frankfurt am Main (DE)

(73) Assignee: TMRW FOUNDATION IP S.ÀR.L., Luxembourg (LU)

( * ) Notice: Subject to any disclaimer, the term of this patent is extended or adjusted under 35 U.S.C. 154(b) by 0 days.

(21) Appl. No.: 17/829,303

(22) Filed: May 31, 2022

(65) Prior Publication Data
US 2023/0388603 A1    Nov. 30, 2023

(51) Int. Cl.
| | | |
|---|---|---|
| H04N 21/4788 | (2011.01) | |
| G06F 3/04815 | (2022.01) | |
| H04L 12/18 | (2006.01) | |
| H04N 21/433 | (2011.01) | |
| H04N 21/439 | (2011.01) | |
| H04N 21/44 | (2011.01) | |

(52) U.S. Cl.
CPC ..... H04N 21/4788 (2013.01); G06F 3/04815 (2013.01); H04L 12/1831 (2013.01); H04N 21/4333 (2013.01); H04N 21/4396 (2013.01); H04N 21/44 (2013.01)

(58) Field of Classification Search
CPC .... H04N 21/44; H04N 21/433; H04N 21/439; H04N 21/4333; H04N 21/4396; H04N 21/4788; H04L 12/18; H04L 12/1813; H04L 12/1831; H04L 67/18; H04L 67/104; H04L 51/04; H04L 51/12; G06F 3/04815

USPC ......................................................... 709/206
See application file for complete search history.

(56) References Cited

U.S. PATENT DOCUMENTS 9,692,831 B1 *   6/2017  Manber ................. H04L 67/143
10,388,325 B1 *  8/2019  Badash ................ G11B 27/031
(Continued)

OTHER PUBLICATIONS

Galetto S, Bottaro P, Carrara C, Secco F, Guidolin A, Targa E, Narduzzi C, Giorgi G. Detection of video/audio streaming packet flows for non-intrusive QoS/QoE monitoring. In2017 IEEE International Workshop on Measurement and Networking (M&N) Sep. 27, 2017 (pp. 1-6). IEEE.). (Year: 2017).*

(Continued)

*Primary Examiner* — James N Fiorillo
(74) *Attorney, Agent, or Firm* — BRYAN CAVE LEIGHTON PAISNER LLP (57) ABSTRACT

A system for controlling user interactions in a virtual meeting includes a cloud server that further includes a processor. The processor controls display of a user interface (UI) that includes a virtual environment to facilitate the virtual meeting among a plurality of participants of the plurality of user devices. The processor receives a first user input corresponding to an activation of a pause UI element to control the first set of device functions that includes pausing outgoing audio as well as an outgoing video feed concomitantly from the first user device. The processor further causes the other user devices to interact in the virtual environment while the outgoing audio and the outgoing video feed from the first user device are selectively paused. Beneficially, the system improves the efficiency, the performance as well as the overall user experience of the virtual environment.

17 Claims, 5 Drawing Sheets

(56) References Cited

U.S. PATENT DOCUMENTS

| | | | |
|---|---|---|---|
| 10,911,832 B2* | 2/2021 | Paglia | H04N 21/4424 |
| 10,999,627 B2* | 5/2021 | Bugajski | H04N 21/4882 |
| 11,294,474 B1* | 4/2022 | Stewart | G06V 40/113 |
| 2005/0071427 A1* | 3/2005 | Dorner | H04N 7/152 709/204 |
| 2006/0288390 A1* | 12/2006 | Kang | H04N 21/8193 725/89 |
| 2008/0163379 A1* | 7/2008 | Robinson | G06F 3/04815 715/738 |
| 2011/0072367 A1* | 3/2011 | Bauer | G06F 3/04815 715/757 |
| 2011/0267419 A1* | 11/2011 | Quinn | G06F 3/04842 348/E7.083 |
| 2011/0271208 A1* | 11/2011 | Jones | H04M 3/567 715/753 |
| 2016/0073059 A1* | 3/2016 | Bader-Natal | H04N 7/148 348/14.03 |
| 2016/0373691 A1* | 12/2016 | Diao | H04L 12/1822 |
| 2017/0006162 A1* | 1/2017 | Bargetzi | H04N 7/147 |
| 2017/0041263 A1* | 2/2017 | Shekel | H04L 51/04 |
| 2017/0374118 A1* | 12/2017 | Pevzner | H04N 7/147 |
| 2018/0095635 A1* | 4/2018 | Valdivia | G02B 27/0093 |
| 2018/0095636 A1* | 4/2018 | Valdivia | G06F 3/011 |
| 2018/0095637 A1* | 4/2018 | Valdivia | H04N 7/157 |
| 2018/0232129 A1* | 8/2018 | Quinn | H04N 21/2387 |
| 2018/0352303 A1* | 12/2018 | Siddique | H04L 65/1069 |
| 2018/0375676 A1* | 12/2018 | Bader-Natal | H04L 65/403 |
| 2019/0088153 A1* | 3/2019 | Bader-Natal | H04N 7/147 |
| 2019/0124400 A1* | 4/2019 | Wang | H04N 21/2187 |
| 2020/0260149 A1* | 8/2020 | Ding | H04N 21/8146 |
| 2020/0293261 A1* | 9/2020 | Janamanchi | H04L 12/1831 |
| 2021/0399911 A1* | 12/2021 | Jorasch | H04L 12/1822 |
| 2022/0150085 A1* | 5/2022 | Tan | H04L 12/1831 |
| 2022/0254120 A1* | 8/2022 | Berliner | G06F 1/163 |
| 2022/0350925 A1* | 11/2022 | Alexander | G06V 20/52 |
| 2022/0360742 A1* | 11/2022 | Krol | G10L 25/51 |
| 2022/0382907 A1* | 12/2022 | Siohan | G06F 21/6254 |
| 2022/0385710 A1* | 12/2022 | Chen | G06F 3/04817 |
| 2023/0015206 A1* | 1/2023 | Xu | G06V 20/40 |
| 2023/0061210 A1* | 3/2023 | Gordan | G06F 40/40 |
| 2023/0068117 A1* | 3/2023 | Johnston | H04L 65/401 |
| 2023/0068413 A1* | 3/2023 | Agrawal | G11B 20/10527 |
| 2023/0078266 A1* | 3/2023 | Werner | H04L 47/122 370/252 |
| 2023/0101672 A1* | 3/2023 | LaFave | G06F 3/04842 715/753 |
| 2023/0353708 A1* | 11/2023 | Springer | H04N 7/155 |

OTHER PUBLICATIONS

Galetto S, Bottaro P, Carrara C, Secco F, Guidolin A, Targa E, Narduzzi C, Giorgi G. Detection of video/audio streaming packet flows for non-intrusive QoS/QoE monitoring. In2017 IEEE International Workshop on Measurement and Networking (M&N) Sep. 27, 2017 (pp. 1-6). IEEE.). (Year: 2017) (Year: 2017).*

European Search Report mailed on Sep. 27, 2023, EP 23176218, 14 pages.

European Search Report for EP Patent Application No. 23176218.3, mailed on Sep. 27, 2023.

* cited by examiner

SYSTEM AND METHOD FOR CONTROLLING USER INTERACTIONS IN VIRTUAL MEETING TO ENABLE SELECTIVE PAUSING

TECHNICAL FIELD

The present disclosure relates generally to the field of three-dimensional (3D) virtual environments, and more specifically, to a system for controlling user interactions in a virtual meeting to enable selective pausing and a method for controlling user interactions in the virtual meeting to enable selective pausing.

BACKGROUND

Many technical advances have been made recently in the field of communication technology to simplify the exchange of information within or outside an enterprise (e.g., an entity, a school, or offices) using online platforms enabled virtual meetings. However, during the virtual meetings there exists a lot of interruptions such as receiving an urgent call, a ringing of the doorbell or any other background sound, and the like. Therefore, for privacy purposes, each user facing such interruptions in the virtual meeting may need to turn off their video output as well as the audio output of the respective user devices.

Conventionally, a user mutes the audio output of the user device by clicking on the mute button and turns off the video output of the user device separately by clicking on a video button of the respective user device. In addition, to inform other participants about such interruptions, the user generally changes status from an active status to a busy status (or mentions about busy status in a chat box available) in the virtual meetings. Moreover, the other participants can see that the user is not available on the user's device or has already mentioned in the chat about the interruptions. However, such actions are ineffective and inefficient because it requires a lot of time and effort to click on different buttons that further reduce the overall user experience of the conventional virtual rooms, which is not desirable. As a result, the challenge is how to improve the efficiency, the performance as well as the overall user experience of the virtual meetings with enhanced privacy features. Therefore, in light of the foregoing discussion, there exists a need to overcome the aforementioned drawbacks associated with the virtual meetings.

SUMMARY

The present disclosure provides a system for controlling user interactions in a virtual meeting to enable selective pausing. The present disclosure provides a method for controlling user interactions in a virtual meeting to enable selective pausing. The present disclosure provides a solution to the existing problem of how to improve the efficiency, the performance as well as the overall user experience of the virtual meetings with improved privacy features. An aim of the present disclosure is to provide a solution that overcomes at least partially the problems encountered in the prior art and provide an improved system and improved methods for controlling user interactions in a virtual meeting to enable selective pausing.

An object of the present disclosure is achieved by the solutions provided in the enclosed independent claims. Advantageous implementations of the present disclosure are further defined in the dependent claims.

In one aspect, the present disclosure provides a system for controlling user interactions in a virtual meeting. Further, the system for controlling user interactions in the virtual meeting includes a cloud server that comprises a processor. The processor is configured to control display of a user interface (UI) on a plurality of user devices. The user interface includes a virtual environment to facilitate the virtual meeting among a plurality of participants of the plurality of user devices. The system is configured to receive a first user input corresponding to an activation of a pause UI element on the UI from a first user device of the plurality of user devices. The system, in response to the received first user input corresponding to the activation of the pause UI element at the first user device, controls a first set of device functions associated with a first set of components of the first user device engaged in the virtual meeting. The control of the first set of device functions comprises pausing an outgoing audio as well as an outgoing video feed concomitantly from the first user device. Further, the system is configured to unsubscribe other user devices of the plurality of user devices in the virtual environment from the outgoing audio as well as the outgoing video feed from the first user device. The system is configured to cause the other user devices of the plurality of user devices to continue to interact in the virtual environment in the virtual meeting while the outgoing audio and the outgoing video feed from the first user device is selectively paused.

The disclosed system for controlling the user interactions in the virtual meeting includes the cloud server that enables the processor to prevent interruptions to the plurality of participants by selectively pausing the virtual meeting. The processor that is included in the cloud server is configured to receive the first user input to activate the pause UI element and to control the first set of device functions associated with the first set of components of the first user device. Additionally, activation of the pause UI element enables the processor to restrict the audio capture component and the image capture unit to prevent the situation of awkwardness for the first participant if the first participant faces the interruptions. Further, the system is configured to cause the other user devices of the plurality of user devices to continue to interact in the virtual environment without facing any interruptions due to the first participant. Therefore, the system improves the efficiency and the performance of the virtual meetings along with the improved overall user experience and improved privacy features.

It is to be appreciated that all the aforementioned implementation forms can be combined. It has to be noted that all devices, elements, circuitry, units, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity that performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
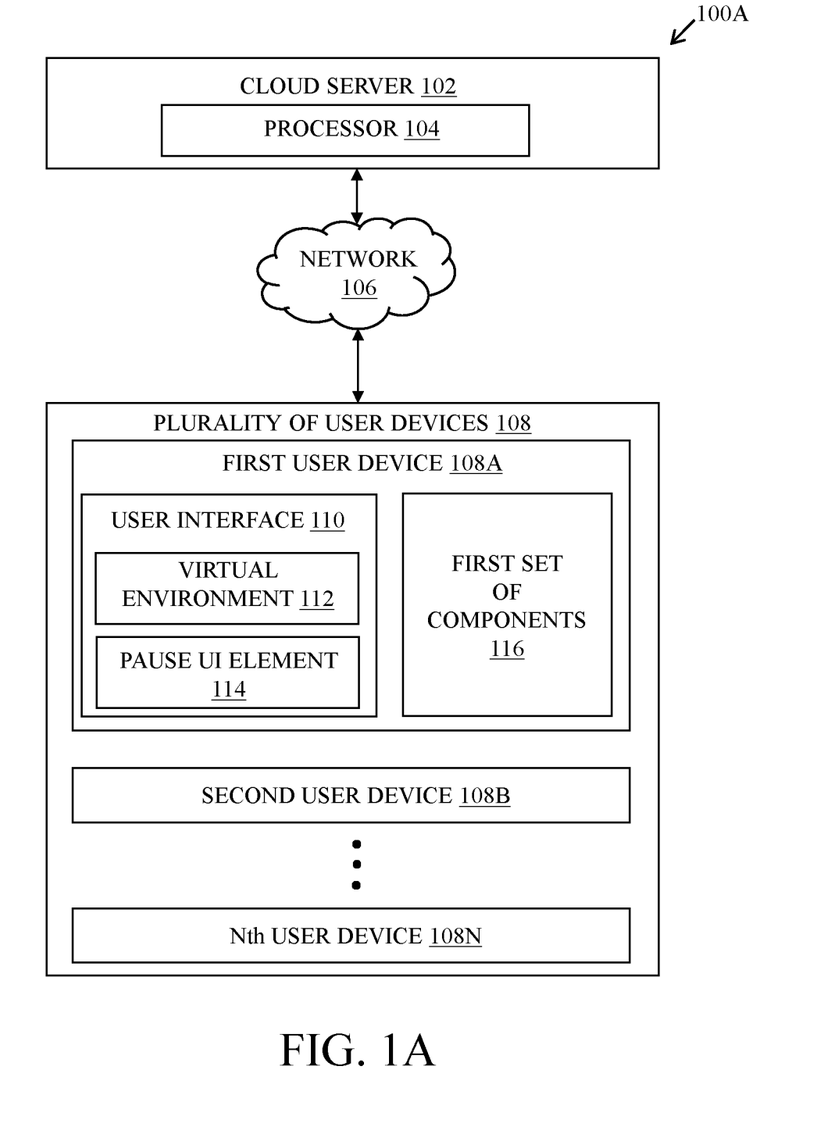
FIG. 1A is a network environment diagram of a system with a cloud server and a plurality of user devices, in accordance with an embodiment of the present disclosure.

FIG. 1A is a network environment diagram of a system for controlling user interactions in a virtual meeting, in accordance with an embodiment of the present disclosure. With reference to FIG. 1A, there is shown a network environment of a system 100A for controlling user interactions in a virtual meeting. The system 100A includes a cloud server 102, a network 106, and a plurality of user devices 108, such as a first user device 108A to an Nth user device 108N. There is further shown that the cloud server 102 includes a processor 104. There is further shown that the first user device 108A includes a user interface (UI) 110, a virtual environment 112, a pause user interface (UI) element 114, and a first set of components 116.

The system 100A may also be referred to as an exemplary implementation of communication in which the cloud server 102 transmits the data to the plurality of user devices 108. The system 100A is used for enabling pausing in a virtual meeting.

The cloud server 102 may include suitable logic, circuitry, interfaces, and/or code that is configured to be used in the system 100A for controlling user interactions in the virtual meeting. Examples of implementation of the cloud server 102 may include but are not limited to, a storage server, a cloud-based server, a web server, an application server, or a combination thereof.

The processor 104 may include suitable logic, circuitry, interfaces, or code that is configured to execute the instructions stored in the cloud server 102 for controlling user interactions in a virtual meeting. In an example, the processor 104 may include but is not limited to a processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry.

The network 106 includes a medium (e.g., a communication channel) through which the cloud server 102, potentially communicates with the plurality of user devices 108. Examples of the network 106 may include, but are not limited to, a cellular network (e.g., a 2G, a 3G, long-term evolution (LTE) 4G, a 5G, or 5G New Radio (NR) network, such as sub 6 GHz, cmWave, or mmWave communication network), a wireless sensor network (WSN), a cloud network, a Local Area Network (LAN), a vehicle-to-network (V2N) network, a Metropolitan Area Network (MAN), and/or the Internet.

Each of the plurality of user devices 108, such as the first user device 108A may include suitable logic, circuitry, interfaces and/or code that is configured to communicate with the cloud server 102 via the network 106 (e.g., a propagation channel). Examples of each of the plurality of user devices 108 may include, but are not limited to, an Internet-of-Things (IoT) device, a smartphone, a machine type communication (MTC) device, a computing device, an evolved universal mobile telecommunications system (UMTS) terrestrial radio access (E-UTRAN) NR-dual connectivity (EN-DC) device, a server, an IoT controller, a drone, customized hardware for wireless telecommunication, a transmitter, or any other portable or non-portable electronic device.

The UI 110 may also be referred to as a graphical user interface (GUI) that is used to display the point of human-computer interaction and communication in a device. The UI 110 includes the virtual environment 112 to facilitate the virtual meeting among a plurality of participants of the plurality of user devices 108.

The virtual environment 112 refers to a virtual construct (e.g., virtual model) designed through any suitable 3D modeling technique through computer-assisted drawings (CAD) methods. Examples of implementation of the virtual environment 112 may include but are not limited to, a web-based document, web-based chat platforms, virtual meet platforms, and the like. The virtual environment 112 enables the each of the plurality of user devices 108 to perform virtual meetings through a virtual environment platform via the network 106.

The pause user interface (UI) element 114 may also be referred to as a pause button, a pause gesture function, a touch button, and the like. The pause UI element 114 may be a button (or a part) of the UI 110 displayed on the UI 110. Moreover, the first set of components 116 includes two or more audio capture components, an audio output component, and an image-capture component of the first user device 108A.

In operation, the system 100A is configured to control user interactions in a virtual meeting. The system 100A includes the cloud server 102 that further includes the processor 104, which is in communication with the plurality of user devices 108 through the network 106. Moreover, the processor 104 is configured to control the display of the UI 110 on each user device from the plurality of user devices 108. The UI 110 of the first user device 108A includes the virtual environment 112 to facilitate the virtual meeting among a plurality of participants of the plurality of user devices 108. Moreover, a first participant (or a user) of the first user device 108A is configured to access the virtual environment 112 through the UI 110 to interact with each of the plurality of participants of the plurality of user devices 108. Similarly, each user device from the plurality of user devices 108 includes a corresponding user interface and a corresponding virtual environment to facilitate the virtual meeting among the plurality of participants of the plurality of user devices 108. Furthermore, each of the plurality of participants of the plurality of user devices 108 is also configured to access the corresponding virtual environment through a corresponding user interface to interact with each other. Therefore, each participant from the plurality of participants is present in the virtual meeting for information exchange through a virtual environment platform, such as through the system 100A. In addition, the processor 104 is configured to control the display of the user interface, such as the UI 110 from user graphical representation that is generated from a live data feed obtained at a three-dimensional coordinate position of the virtual environment, such as the virtual environment 112 to enable real-time multi-user collaboration and interactions in the virtual environment 112. The processor 104 is further configured to update the UI 110 to facilitate an interactive virtual meeting among the plurality of participants of the plurality of user devices 108.

In accordance with an embodiment, the virtual environment 112 is a three-dimensional (3D) virtual environment, and the virtual meeting is at least one of a videoconferencing meeting, a virtual audio-visual meeting in the 3D virtual environment that is shared among the plurality of participants of the plurality of user devices 108, or an augmented reality-based virtual meeting. The 3D virtual environment includes an arrangement and visual appearance, which may be customized by each of the plurality of participants of the plurality of user devices 108 depending on preferences or needs. In an implementation, each of the plurality of participants may access the 3D virtual environment through a corresponding user interface, such as a user graphical representation that may be inserted into a corresponding virtual environment and graphically combined with the 3D virtual environment. The user graphical representations may be supplemented with additional features such as participant status providing further details about the current availability or other data relevant to other participants. In some embodiments, the interactions, such as conversation and collaboration between the participants in the virtual environment 112 along with interactions with objects within the virtual environment 112 are enabled. In addition, at least the videoconferencing meeting, the virtual audio-visual meeting, or the augmented reality-based virtual meeting is beneficial to enable the virtual presence, real-time multi-user collaboration, and realistic interactions in the virtual environment 112, which may increase the realism of remote activity.

In some embodiments, the processor 104 is further configured to remove a background of each participant of the plurality of participants from a corresponding video feed captured at each of the plurality of user devices 108 and merge a video cut-out of each participant of the plurality of participants devoid of their background in the virtual environment 112. Therefore, the processor 104 provides the user graphical representation in the 3D virtual environment of each participant from the plurality of the participants in the virtual environment 112 that further increases the quality of the user experience. Moreover, the removal of the background of each participant as well as merging of the video cut-out of each participant of the plurality of participants devoid enables the virtual presence, real-time multi-user collaboration, and realistic interactions in the virtual environment 112.

There is provided that, each participant from the plurality of participants is attending the virtual meeting through a corresponding virtual environment of the corresponding user interface. Furthermore, if an interruption takes place while attending the virtual meeting, then a participant, such as the first participant of the first user device 108A does not want to share an audio output as well as a video output of the first user device 108A with the rest of participants. The interruption can be, for example, an urgent call, or someone coming physically to the participant to speak about something of importance, someone ringing the bell or knocking on the door, and the like. Thereafter, the processor 104 is configured to receive a first user input corresponding to an activation of the pause UI element 114 on the UI 110 from the first user device 108A of the plurality of user devices 108. In an example, the first user input includes a first gesture input on the pause UI element 114 of the first user device 108A. In another example, the first user input includes a first mouse click on the pause UI element 114 of the first user device 108A. In yet another example, the first user input can include other possible combinations of inputs on the pause UI element 114 of the first user device 108A. Thereafter, in response to the received first user input corresponding to the activation of the pause UI element 114 at the first user device 108A, the processor 104 is configured to control a first set of device functions associated with the first set of components 116 of the first user device 108A engaged in the virtual meeting. Moreover, the control of the first set of device functions includes pausing an outgoing audio as well as an outgoing video feed concomitantly from the first user device 108A. Therefore, the processor 104 is configured to prevent the outgoing audio as well as the outgoing video feed concomitantly of the first user device 108A from the plurality of participants of the plurality of user devices 108. In addition, the activation of the pause UI element 114 at the first user device 108A requires a comparatively lesser time and lesser effort, which is beneficial to improve the first participant's experience in the virtual meeting. Moreover, the activation of the pause UI element 114 at the first user device 108A is beneficial to increase the privacy level of the first participant, decrease "awkwardness" whenever an interruption takes place, and finally increase the quality of experience of the plurality of participants.

In accordance with an embodiment, the first set of components includes two or more of an audio capture component, an audio output component, and an image-capture component of the first user device 108A. Moreover, at least the audio capture component device and the first-image capture component device of the first user device 108A is deactivated concomitantly based on the first user input on the pause UI element 114. An exemplary implementation of the first set of components is further shown and described in FIG. 2. Moreover, examples of implementations of the audio capture components may include but are not limited to a mic, an audio interface and recording bundle, a voice recorder, and the like. Similarly, examples of implementations of the audio output component may include but are not limited to a speaker, an earphone, an audio sound system, and the like. Furthermore, examples of implementations of the image-capture component may include but are not limited to a virtual camera, a real-time camera, a video camera, and the like. Moreover, concomitant deactivation of the at least the audio capture component device and the first-image capture component device is used to quickly turn off the first participant's video and audio while decreasing the effort and number of actions of the first participant with improved privacy.

In accordance with an embodiment, the control of the first set of device functions further includes communicating a notification to the other devices of the plurality of user devices 108. The notification includes paused information that is indicative of the activation of the pause UI element 114 at the first user device 108A in the virtual environment 112. In an implementation, the processor 104 is configured to use the network 106 to communicate the information to the other devices of the plurality of user devices 108. Moreover, the paused information included by the notification is beneficial to indicate the each participant of the plurality of user devices 108 that the first participant of the first user device 108A is facing some interruptions.

In accordance with an embodiment, the pausing of the outgoing video feed at the first user device 108A includes selecting and freezing an image frame captured by an image-capture component of the first user device 108A previous to the activation of the UI element at the first user device 108A, and the paused information includes the frozen image frame. For example, the first user device 108A activates the pause UI element that causes the pausing of the outgoing video feed and selecting and freezing of the image frame captured by the image-capture component. Similarly, a second user device 108B may activate a corresponding pause UI element that causes the pausing of a corresponding outgoing video feed and selecting and freezing of a corresponding image frame captured by a corresponding image-capture component. In an implementation, artificial intelligence (AI) algorithms are used for the selection of the image frame captured by the image-capture component of the first user device 108A. The AI algorithms select the image frame from the set of frames by analyzing the live camera feed of the first participant from the plurality of participants. The AI algorithms select the best image frame from a range of image frames of the user so that the best image frame is the one displayed to other users in the virtual environment 112. In this disclosure, the term "best" as used in "best image frame" refers to an image frame that depicts features of the user as clear as possible or as close as possible to a standard selected by the user. To select the best image frame, the AI algorithms may thus be trained with a plurality of images of the user selected by the user. If the AI algorithms cannot find a suitable image frame, then the selection of the image frame may default to a profile picture of the user. Moreover, the selection of image frames from the set of frames includes the user graphical representation that is a user 3D virtual cut-out constructed from the user uploaded or third part source (e.g., from a social media website) photo, or a user real-time 3D virtual cut-out that includes the real-time video stream of the first participant from the plurality of the participants. In some embodiments, the pausing of the outgoing video feed at the first user device 108A includes a blurring out an image of a first participant captured by the image-capture component of the first user device 108A. In another embodiment, the pausing of the outgoing video feed at the first user device 108A includes modifying a transparency parameter of the image of the first participant. In yet another embodiment, the pausing of the outgoing video feed at the first user device 108A includes a modifying a color parameter of the image of the first participant. Moreover, the paused information includes the blurred-out image, or the modified transparency parameter, or the modified color parameter of the image of the first participant. In an implementation, the video with the removed background includes a video streamed to the other user devices that includes the displaying of the video of the first participant utilizing a polygonal structure. In another implementation, the polygonal structure can be a quad structure or more complex 3D structure to provide a virtual frame to the plurality of the participants. Beneficially, the selection of the image frame from the set of frames enables the processor 104 to select the best possible user graphical representation of the first participant through the first user device 108A.

In accordance with an embodiment, the pausing of the outgoing video feed at the first user device 108A includes inserting a label on the image of the first participant. In another embodiment, the pausing of the outgoing video feed at the first user device 108A includes inserting a graphical icon on the image of the first participant from the plurality of the participants. Further, the paused information includes the inserted label or the graphical icon on the image of the first participant. Therefore, the information along with the paused information is communicated to the other devices of the plurality of user devices to indicate the other participants that the first participant is going through a disruption. Moreover, the inserted label or the graphical icon is used to improve the quality of the user experience of each participant in the virtual environment 112.

In accordance with an embodiment, the processor 104 is further configured to receive a second user input from the first user device 108A subsequent to the receipt of the first user input to further activate the pause UI element 114 on the UI 110. In an implementation, the second user input includes a second gesture input on the pause UI element 114 of the first user device 108A subsequent to the receipt of the first user input. In another example, the second user input includes a second mouse click on the pause UI element 114 of the first user device 108A after the receipt of the first user input. In yet another example, the second user input can include other possible combinations of inputs on the pause UI element 114 of the first user device 108A after the receipt of the first user input. In such embodiment, the processor 104 is further configured to control a second set of device functions concomitant to the first set of device functions when the second user input is received subsequent to the receipt of the first user input. Therefore, the second user input received by the processor 104 is used to activate the pause UI element 114 on the UI 110, and also to control the second set of device functions concomitant to the first set of device functions. In some embodiments, the control of the second set of device functions includes restricting incoming audio from the other user devices to be played at the first user device 108A independent of muting corresponding audio capture device components of the other user devices.

In such embodiments, the processor 104 is configured to control the components of the first user device 108A, because the first user input is received on the first user device 108A, and not on other user devices. Similarly, the processor 104 can control the components of the subsequent user devices, such as the second user device 108B based on user inputs received on the second user device 108B without controlling the components of other user devices from the plurality of user devices 108. As a result, the other participants of the other user devices can continue to interact with each other in the virtual meeting. Furthermore, restricting the incoming audio from the other user devices prevents the first participant from the interruptions due to the incoming audio from the other participants.

The processor 104 is further configured to unsubscribe other user devices of the plurality of user devices 108 in the virtual environment from the outgoing audio as well as the outgoing video feed from the first user device 108A. As a result, the processor 104 is configured to reduce the interruptions in the virtual meeting that can be received from the first user device 108A. In an implementation, a publish-subscribe communications module (or a pub-sub model) is used by the processor 104 to unsubscribe other user devices of the plurality of user devices 108. In an example, the publish-subscribe communications module is used as a communications model where data (e.g., position, audio, and video) of a participant, such as the first participant is published to a specific area of the virtual environment 112 and another participant that wants to view and listen to it subscribes to the content of the virtual environment 112. The publish-subscribe communications module corresponds to a model of communication-based on the production and consumption of content in which the communication through the publish-subscribe model may be enabled to be anonymous, meaning that the cloud server 102 and/or each of the plurality of user devices 108 do not need to know about subscription to obtain the resources of the virtual environment 112. The publish-subscribe communications module enables information exchange to which each participant can publish and receive information, enabling greater degrees of flexibility than typical client-server models. The publish-subscribe communications module of the current disclosure enables dynamically concentrating a greater number of resources to each of the plurality of user devices 108 that require them the most, such as to higher-resource demanding cells where a user device can subscribe. Also, as the number of resources published improves the amount of the virtual environment 112, and the level of interactions within the portion of the virtual environment 112 visible to each participant.

The processor 104 is further configured to cause the other user devices of the plurality of user devices 108 to continue to interact in the virtual environment 112 in the virtual meeting while the outgoing audio and the outgoing video feed from the first user device 108A is selectively paused. For example, the first participant from the plurality of participants requests for the activation of the pause UI element 114, such as through the first user input and the second user input. Thereafter, the processor 104 is configured to control the first set of device functions associated with the first set of components, and the second set of device functions of the first user device 108A that is engaged in the virtual meeting. Moreover, the incoming audio, outgoing video feed, and the outgoing audio of the other user devices from the plurality of the user devices 108 continue to interact with each other, without facing any disturbance due to the first participant who is facing the interruptions. In addition, the paused participant, such as the first participant would still be able to see the movement of other participants in the virtual meeting, which is used to improve the level of interactions within the virtual environment 112.

In accordance with an embodiment, the control of the first set of device functions further includes recording an audio-visual segment of the virtual environment 112 of the virtual meeting for a first period corresponding to the activation of the pause UI element 114 until the pause UI element 114 is deactivated. For example, recording the incoming audio feed as well as an incoming video feed concomitantly from the plurality of user devices 108. The recording of the audio-visual segment of the virtual environment 112 of the virtual meeting for the first period is beneficial to record the interaction between the plurality of participants of the plurality of user devices 108. In such embodiments, the processor 104 is further configured to cause the first user device 108A to extract the recording of the audio-visual segment of the virtual environment 112 of the virtual meeting for the first period for a user consumption at a second period different from the first period. For example, extracting the recording of the audio-visual segment of the virtual environment 112 of the virtual meeting for the first period for the user consumption at the second period from the plurality of user devices 108. Moreover, the extracted interaction between the plurality of participants can be used by the first participant to catch up later with whatever was missed.

The system 100A for controlling the user interactions in the virtual meeting includes the cloud server 102 that enables the processor 104 to prevent interruptions to the plurality of participants by selectively pausing the virtual meeting. The processor 104 that is included in the cloud server 102 is configured to receive the first user input to activate the pause UI element 114 to control the first set of device functions associated with the first set of components 116 of the first user device. Additionally, activation of the pause UI element 114 enables the processor 104 to restrict the audio capture component and the image capture unit to prevent the situation of awkwardness for the first participant if the first participant faces the interruptions. Further, the system 100A is configured to cause the other user devices of the plurality of user devices 108 to continue to interact in the virtual environment 112 without facing any interruptions due to the first participant. The first participant from the plurality of the participants restricts the audio output of the other user device through the second input request that enables the first participant to attain more privacy and prevent interruption due to the other devices. Therefore, the system 100A improves the efficiency and the performance of the virtual meetings along with the improved overall user experience and improved privacy features.

Figure 1B:
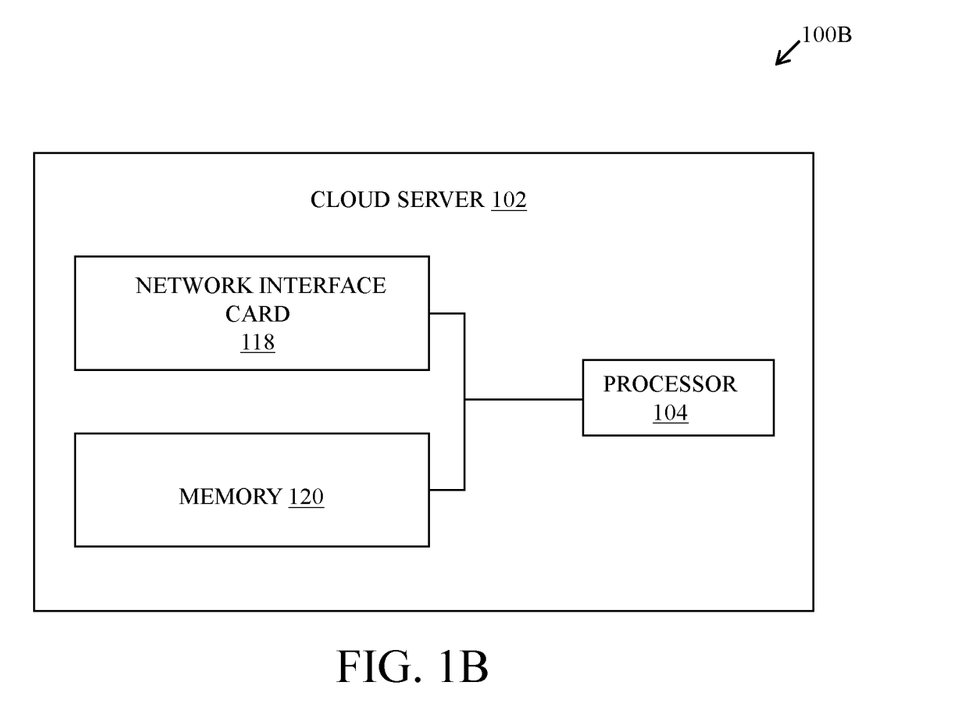
FIG. 1B is a block diagram of a cloud server, in accordance with another embodiment of the present disclosure.

FIG. 1B is a block diagram of a cloud server, in accordance with another embodiment of the present disclosure. FIG. 1B is shown in conjunction with elements from FIG. 1A. With reference to FIG. 1B, there is shown a block diagram 100B of the cloud server 102. In an implementation, the cloud server 102 further includes the processor 104, a network interface card 118, and a memory 120. The processor 104 is communicably coupled to the network interface card 118 and the memory 120. In this implementation, the operations executed by the cloud server 102 may be executed and controlled by the processor 104.

The network interface card 118 includes suitable logic, circuitry, and/or interfaces that are used by the processor 104 to communicate with the plurality of user devices 108 through the network 106 of FIG. 1A. The memory 120 includes suitable logic, circuitry, and/or interfaces that are configured to hold memory allocation information received by the cloud server 102. Examples of implementation of the memory 120 may include, but are not limited to, Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

Figure 2:
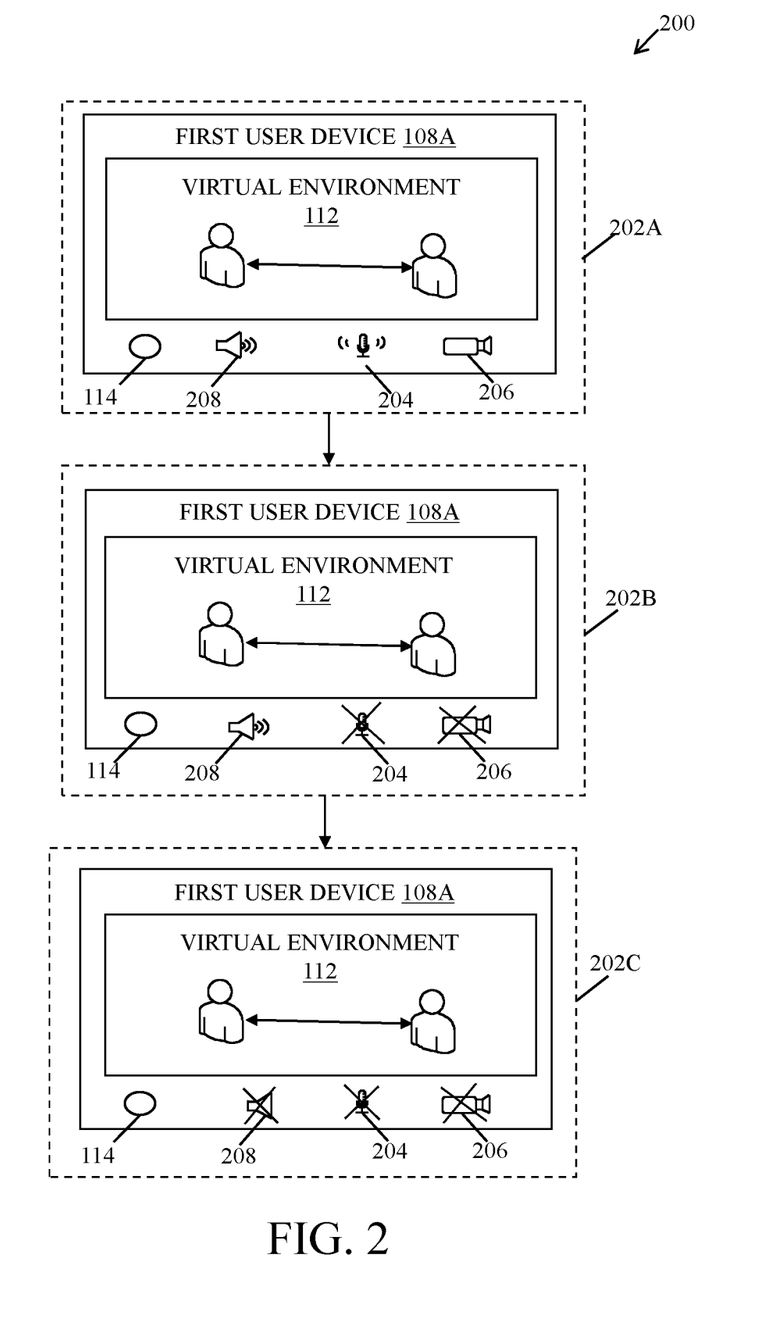
FIG. 2 is a sequence diagram that illustrates different operations for activation of a pause UI element by a first user device, in accordance with another embodiment of the present disclosure.

FIG. 2 is a sequence diagram that illustrates different operations for activation of a pause UI element by a first user device, in accordance with another embodiment of the present disclosure. FIG. 2 is shown in conjunction with elements from FIG. 1A and FIG. 1B. With reference to FIG. 2, there is shown a sequence diagram 200 that illustrates different operations for the activation of the pause UI element 114 by the first user device 108A. The sequence diagram 200 includes the series of operations 202A-to-202C.

In the sequence diagram 200, there is shown that the first user device 108A is configured to send the first user input and the second user input to the processor 104, such as for the activation of the pause UI element 114. The activation of the pause UI element 114 enables the first user device 108A to control the first set of device functions associated with the first set of components 116, such as an audio capture component 204 as well as a image-capture component 206 of the first user device 108A engaged in the virtual meeting and further control the second set of device functions associated with an audio component 208 for restricting the incoming audio from the other user devices to be played at the first user device 108A.

At operation 202A, the first participant from the plurality of the participants sends the first user input through the first user device 108A, and the processor 104 receives the first user input from the first user device 108A. Thereafter, the processor 104 controls the first set of components 116 of the first user device 108A, such as pausing the outgoing audio through the audio capture component 204 and pausing the outgoing video feed through the image-capture component 206 concomitantly from the first user device 108A, such as at operation 202B. In an implementation, the pausing of the outgoing video feed at the first user device 108A includes selecting and freezing the image frame captured by the image-capture component 206 of the first user device 108A. In another implementation, the image frame from the set of last frames is selected through AI algorithms to ensure the best possible representation. In another implementation, in response to the processor not finding a best representation from the last image frames, the image selection defaults to the profile picture of the first participant. In another implementation, the pausing of the outgoing video feed at the first user device 108A includes a blurring out an image of a first participant captured by the image-capture component 206 of the first user device 108A. In another example, the pausing of the outgoing video feed at the first user device 108A includes modifying a transparency parameter of the image of the first participant. In yet another example, the pausing of the outgoing video feed at the first user device 108A includes modifying a color parameter of the image of the first participant. Moreover, the paused information includes the blurred-out image or the modified transparency parameter, or the modified color parameter of the image of the first participant. In another implementation, the selection of the image frame includes displaying the profile picture of the first participant.

Furthermore, at operation 202C, the first participant from the plurality of the participants sends the second user input from the first user device 108A. Thereafter the processor 104 is configured to receive the second user input from the first user device 108A subsequent to the receipt of the first user input to further activate the pause UI element 114 on the UI 110. The second user input enables the processor 104 to control the set of device functions. The second set of device functions includes restricting incoming audio from the other user devices to be played at the first user device 108A independent of muting the audio capture components of the other user devices.

The processor 104 controls the first set of device functions associated with the first set of components 116 of the first user device 108A such as pausing the outgoing audio from the audio capture component 204 as well as pausing the outgoing video feed from the image-capture component 206 concomitantly from the first user device 108A. Further, the processor 104 controls the second set of device functions associated with the audio component 208 to restrict the incoming audio from the other user devices to be played at the first user device 108A independent of muting the audio capture components of the other user devices. Hence, the processor 104 enables the first participant from the plurality of the participants to improve the efficiency and the performance of the virtual meetings to further improve the overall user experience of the first participant from the plurality of the participants.

Figure 3A:
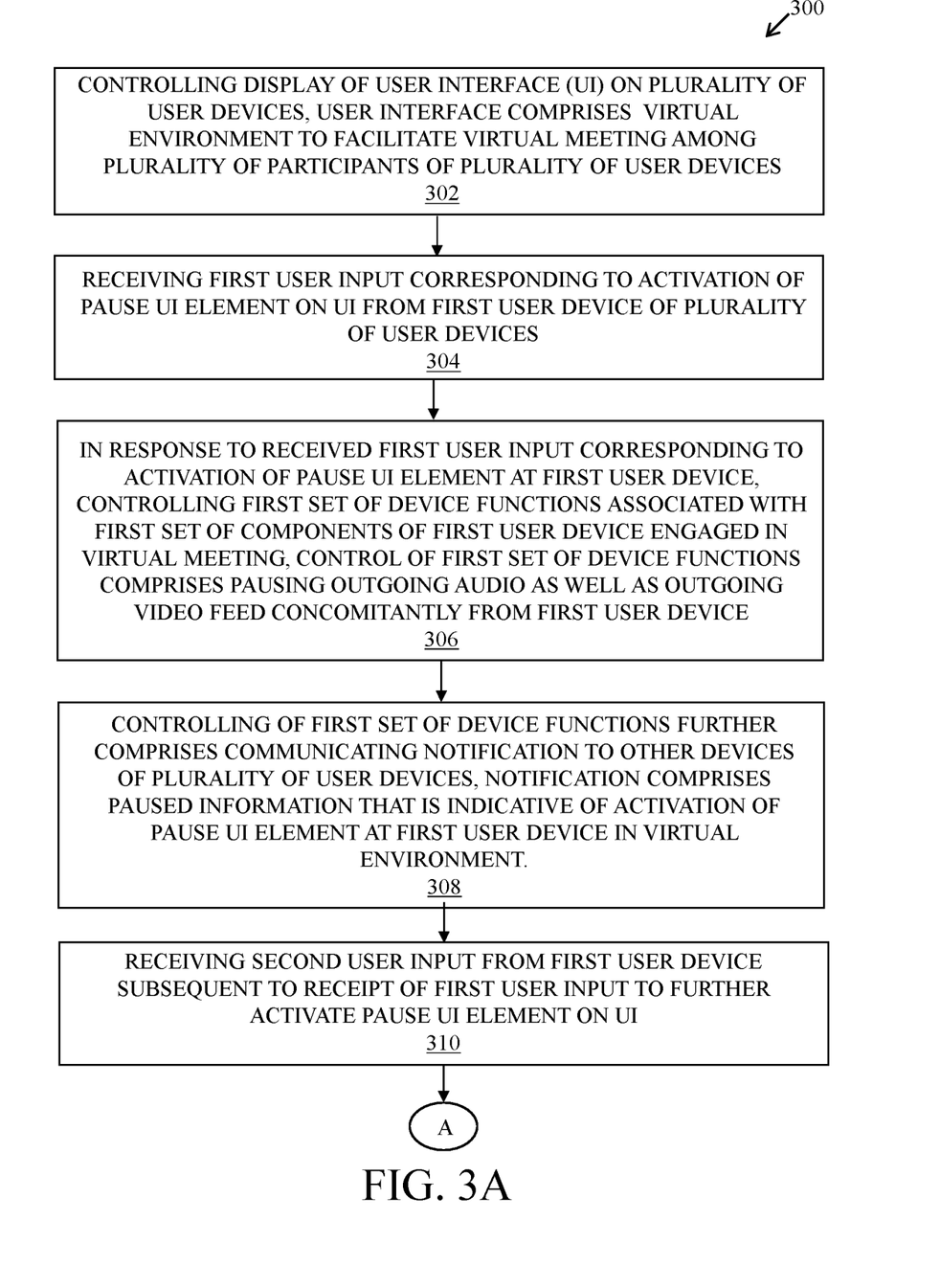
FIGS. 3A and 3B collectively is a flowchart of a method for controlling user interactions in a virtual meeting, in accordance with an embodiment of the present disclosure.
Figure 3B:
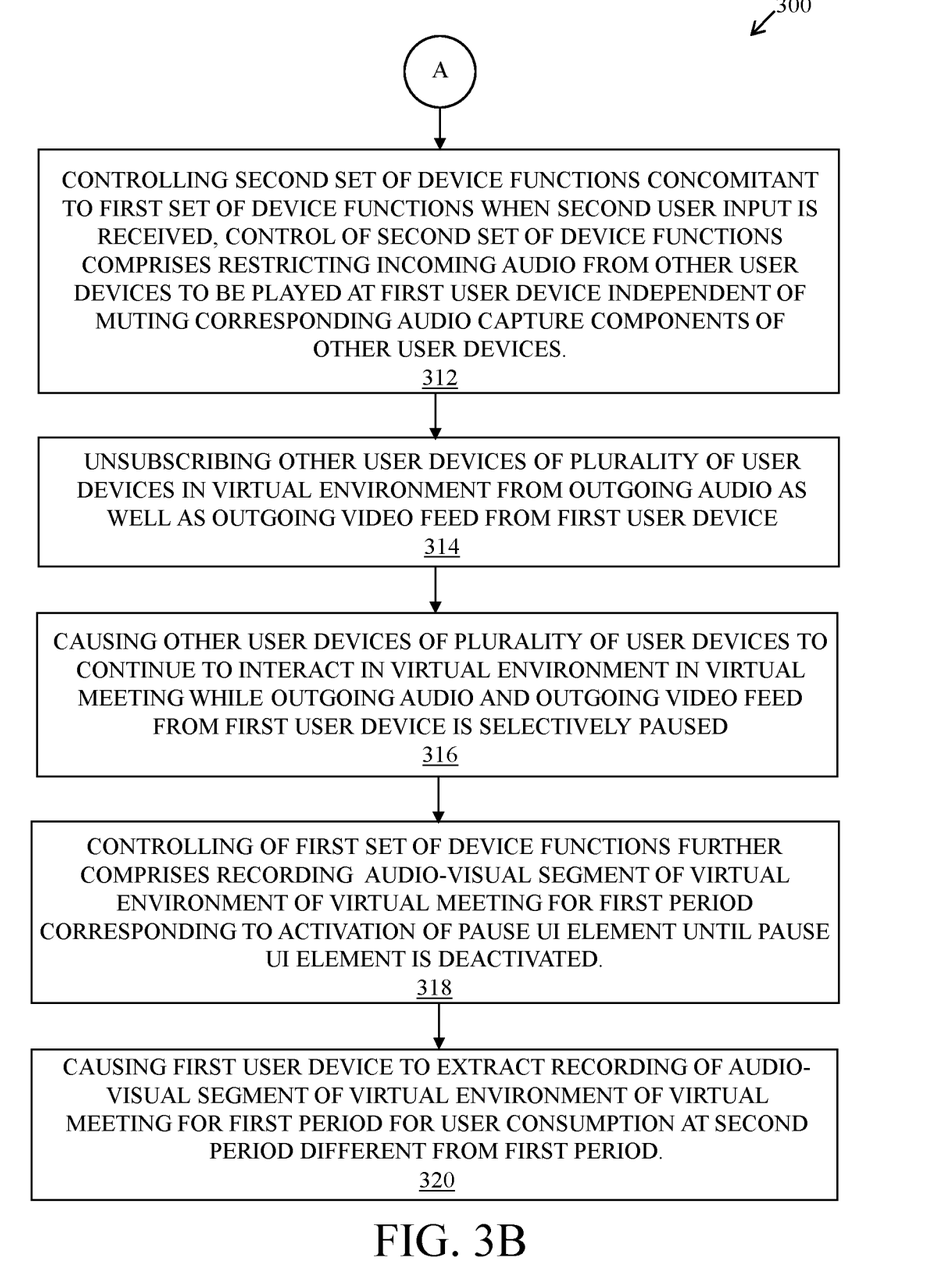

FIGS. 3A and 3B collectively is a flowchart of a method for controlling user interactions in a virtual meeting, in accordance with an embodiment of the present disclosure. FIG. 3 is described in conjunction with elements from FIGS. 1A, 1B, and 2. With reference to FIGS. 3A and 3B, there is shown a flowchart of a method 300 that includes steps 302 to 320. The cloud server 102 is configured to execute the method 300. There is provided the method 300 for controlling user interactions in a virtual meeting.

At step 302, the method 300 includes using the cloud server for controlling the display of the user interface (UI) 110 on the plurality of user devices 108. The UI 110 includes the virtual environment 112 to facilitate the virtual meeting among a plurality of participants of the plurality of user devices 108. The processor 104 is in communication with the plurality of user devices 108 through the network 106. Moreover, a first participant (or a user) of the first user device 108A is configured to access the virtual environment 112 through the UI 110 to interact with each of the plurality of participants of the plurality of user devices 108. Similarly, each user device from the plurality of user devices 108 includes a corresponding user interface and a corresponding virtual environment to facilitate the virtual meeting among the plurality of participants of the plurality of user devices 108. Furthermore, each of the plurality of participants of the plurality of user devices 108 is also configured to access the corresponding virtual environment through a corresponding user interface to interact with each other. Therefore, each participant from the plurality of participants is present in the virtual meeting for information exchange through a virtual environment platform, such as through the system 100A. In addition, the processor 104 is configured to control the display of the user interface, such as the UI 110 from user graphical representation that is generated from a live data feed obtained at a three-dimensional coordinate position of the virtual environment, such as the virtual environment 112 to enable real-time multi-user collaboration and interactions in the virtual environment 112. The processor 104 is further configured to update the UI 110 to facilitate an interactive virtual meeting among the plurality of participants of the plurality of user devices 108.

There is provided that, each participant from the plurality of participants is attending the virtual meeting through a corresponding virtual environment of the corresponding user interface. Furthermore, if an interruption takes place while attending the virtual meeting, then a participant, such as the first participant of the first user device 108A does not want to share an audio output as well as a video output of the first user device 108A with the rest of participants. The interruption can be, for example, an urgent call, or someone coming physically to the participant to speak about something of importance, someone ringing the bell or knocking on the door, and the like.

At step 304, the method 300 includes using the cloud server 102 for receiving a first user input corresponding to an activation of the pause UI element 114 on the UI 110 from the first user device 108A of the plurality of user devices 108. In an example, the first user input includes a first gesture input on the pause UI element 114 of the first user device 108A. In another example, the first user input includes a first mouse click on the pause UI element 114 of the first user device 108A. In yet another example, the first user input can include other possible combinations of inputs on the pause UI element 114 of the first user device 108A.

At step 306, the method 300 includes using the cloud server 102, and in response to the received first user input corresponding to the activation of the pause UI element 114 at the first user device 108A, controlling the first set of device functions associated with the first set of components 116 of the first user device 108A engaged in the virtual meeting. Moreover, the control of the first set of device functions includes pausing an outgoing audio as well as an outgoing video feed concomitantly from the first user device 108A. Therefore, the processor 104 is configured to prevent the outgoing audio as well as the outgoing video feed concomitantly of the first user device 108A from the plurality of participants of the plurality of user devices 108. In addition, the activation of the pause UI element 114 at the first user device 108A requires a comparatively lesser time and lesser effort, which is beneficial to improve the first participant's experience in the virtual meeting. Moreover, the activation of the pause UI element 114 at the first user device 108A is beneficial to increase the privacy level of the first participant, decrease "awkwardness" whenever an interruption takes place, and finally increase the quality of experience of the plurality of participants.

At step 308, the method 300 includes using the cloud server 102 for controlling the first set of device functions and for communicating a notification to the other devices of the plurality of user devices 108. Moreover, the notification comprises paused information that is indicative of the activation of the pause UI element 114 at the first user device 108A in the virtual environment. In an implementation, the processor 104 is configured to use the network 106 to communicate the information to the other devices of the plurality of user devices 108. Moreover, the paused information included by the notification is beneficial to indicate to each participant of the plurality of user devices 108 that the first participant of the first user device 108A is facing some interruptions.

At step 310, the method 300 includes using the cloud server 102 for receiving a second user input from the first user device 108A subsequent to the receipt of the first user input to further activate the pause UI element 114 on the UI 110. In an implementation, the second user input includes a second gesture input on the pause UI element 114 of the first user device 108A subsequent to the receipt of the first user input. In another example, the second user input includes a second mouse click on the pause UI element 114 of the first user device 108A after the receipt of the first user input. In yet another example, the second user input can include other possible combinations of inputs on the pause UI element 114 of the first user device 108A after the receipt of the first user input.

At step 312, the method 300 includes using the processor 104 for controlling a second set of device functions concomitant to the first set of device functions when the second user input is received. Moreover, the control of the second set of device functions includes restricting incoming audio from the other user devices to be played at the first user device 108A independent of muting corresponding audio capture components of the other user devices. Therefore, the second user input received by the processor 104 is used to activate the pause UI element 114 on the UI 110, and to control the second set of device functions concomitant to the first set of device functions.

At step 314, the method 300 includes using the cloud server 102 for unsubscribing other user devices of the plurality of user devices 108 in the virtual environment 112 from the outgoing audio as well as the outgoing video feed from the first user device 108A. As a result, the processor 104 is configured to reduce the interruptions in the virtual meeting that can be received from the first user device 108A. In an implementation, a publish-subscribe communications module (or a pub-sub model) is used by the processor 104 to unsubscribe other user devices of the plurality of user devices 108.

At step 316, the method 300 includes using the cloud server 102 for causing the other user devices of the plurality of user devices 108 to continue to interact in the virtual environment 112 in the virtual meeting while the outgoing audio and the outgoing video feed from the first user device 108A is selectively paused. For example, the first participant from the plurality of participants requests for the activation of the pause UI element 114, such as through the first user input and the second user input. Thereafter, the processor 104 is configured to control the first set of device functions associated with the first set of components, and the second set of device functions of the first user device 108A that is engaged in the virtual meeting. Moreover, the incoming audio, outgoing video feed, and the outgoing audio of the other user devices from the plurality of the user devices 108 continue to interact with each other, without facing any disturbance due to the first participant who is facing the interruptions. In addition, the paused participant, such as the first participant would still be able to see the movement of other participants in the virtual meeting, which is used to improve the level of interactions within the virtual environment 112.

At step 318, the method 300 includes controlling the first set of device functions that further includes recording an audio-visual segment of the virtual environment 112 of the virtual meeting for a first period corresponding to the activation of the pause UI element 114 until the pause UI element 114 is deactivated. For example, recording the incoming audio feed as well as an incoming video feed concomitantly from the plurality of user devices 108. The recording of the audio-visual segment of the virtual environment 112 of the virtual meeting for the first period is beneficial to record the interaction between the plurality of participants of the plurality of user devices 108.

At step 320, the method 300 includes causing the first user device 108A to extract the recording of the audio-visual segment of the virtual environment 112 of the virtual meeting for the first period for a user consumption at a second period different from the first period. For example, extracting the recording of the audio-visual segment of the virtual environment 112 of the virtual meeting for the first period for the user consumption at the second period from the plurality of user devices 108. Moreover, the extracted interaction between the plurality of participants can be used by the first participant to catch up later with whatever was missed.

The method 300 for controlling the user interactions in the virtual meeting includes using the cloud server 102 for preventing interruptions to the plurality of participants by selectively pausing the virtual meeting. The method 300 includes receiving the first user input for activating the pause UI element 114 to control the first set of device functions associated with the first set of components 116 of the first user device. Additionally, activation of the pause UI element 114 enables the processor 104 to restrict the audio capture component and the image capture unit to prevent the situation of awkwardness for the first participant if the first participant faces the interruptions. Further, the method 300 includes causing the other user devices of the plurality of user devices 108 to continue to interact in the virtual environment 112 without facing any interruptions due to the first participant. The first participant from the plurality of the participants restricts the audio output of the other user device through the second input request that enables the first participant to attain more privacy and prevent interruption due to the other devices. Therefore, the method 300 improves the efficiency and the performance of the virtual meetings along with the improved overall user experience and improved privacy features.

The steps 302 to 320 are only illustrative, and other alternatives can also be provided where one or more steps are added, one or more steps are removed, or one or more steps are provided in a different sequence without departing from the scope of the claims herein.

There is further provided a non-transitory computer-readable medium having stored thereon computer-implemented instructions which, when executed by a computer, cause the computer to perform the method 300. In an example, the instructions are implemented on the computer-readable media, which include, but is not limited to, Electrically Erasable Programmable Read-Only Memory (EEPROM), Random Access Memory (RAM), Read-Only Memory (ROM), Hard Disk Drive (HDD), Flash memory, a Secure Digital (SD) card, Solid-State Drive (SSD), a computer-readable storage medium, and/or CPU cache memory. The non-transitory computer-readable medium causes the computer to execute operations includes controlling the display of the UI 110 on the plurality of user devices 108. The UI 110 includes the virtual environment 112 to facilitate the virtual meeting among the plurality of participants of the plurality of user devices 108. Further, the non-transitory computer-readable medium is configured for receiving the first user input corresponding to the activation of the pause UI element 114 on the UI 110 from the first user device 108A of the plurality of user devices 108. Further, in response to the received first user input corresponding to the activation of the pause UI element 114 at the first user device 108A and controlling the first set of device functions associated with the first set of components 116 of the first user device 108A engaged in the virtual meeting. The first set of device function includes pausing the outgoing audio as well as the outgoing video feed concomitantly from the first user device 108A. Further, unsubscribing other user devices of the plurality of user devices 108 in the virtual environment 112 from the outgoing audio as well as the outgoing video feed from the first user device 108A. In addition, causing the other user devices of the plurality of user devices 108 to continue to interact in the virtual environment 112 in the virtual meeting while the outgoing audio and the outgoing video feed from the first user device 108A is selectively paused.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

The invention claimed is:

1. A system for controlling user interactions in a virtual meeting, comprising:
   a cloud server that comprises a processor, wherein the processor is configured to:
   control display of a user interface on a plurality of user devices, wherein the user interface comprises a virtual environment to facilitate the virtual meeting among a plurality of participants of the plurality of user devices;
   receive a first user input corresponding to an activation of a pause user interface element on the user interface from a first user device of the plurality of user devices;
   in response to the received first user input corresponding to the activation of the pause user interface element at the first user device,
   (1) control a first set of device functions associated with a first set of components of the first user device engaged in the virtual meeting, and
   (2) select a frozen image frame for display from a set of image frames previously captured by an image-capture component of the first user device during the virtual meeting and prior to the activation of the pause user interface element, wherein the frozen image frame for display is selected based on a user standard,
   wherein the control of the first set of device functions comprises pausing an outgoing audio as well as an outgoing video feed concomitantly from the first user device, and
   wherein the first set of components comprises an audio capture component and the image-capture component of the first user device;
   cause the other user devices of the plurality of user devices to continue to interact in the virtual environment in the virtual meeting while the outgoing audio and the outgoing video feed from the first user device is selectively paused;

receive a second user input from the first user device subsequent to the receipt of the first user input to further activate the pause user interface element on the user interface; and in response to the second user input,
(1) control a second set of device functions concomitant to the first set of device functions when the second user input is received subsequent to the receipt of the first user input, and
(2) the control of the second set of device functions comprises restricting incoming audio from the other user devices to be played at the first user device independent of muting corresponding audio capture components of the other user devices.

2. The system according to claim 1, wherein the control of the first set of device functions further comprises recording an audio-visual segment of the virtual environment of the virtual meeting for a first period corresponding to the activation of the pause user interface element until the pause UI element is deactivated.

3. The system according to claim 2, wherein the processor is further configured to cause the first user device to extract the recording of the audio-visual segment of the virtual environment of the virtual meeting for the first period for a user consumption at a second period different from the first period.

4. The system according to claim 1, wherein the control of the first set of device functions further comprises communicating a notification to the other devices of the plurality of user devices, wherein the notification comprises paused information that is indicative of the activation of the pause user interface element at the first user device in the virtual environment.

5. The system according to claim 4, wherein the pausing of the outgoing video feed at the first user device comprises at least one of: blurring out an image of a first participant captured by the image-capture component of the first user device, modifying a transparency parameter of the image of the first participant, or modifying a color parameter of the image of the first participant, wherein the paused information comprises one or more of: the blurred out image, the modified transparency parameter, or the modified color parameter of the image of the first participant.

6. The system according to claim 4, wherein the pausing of the outgoing video feed at the first user device comprises at least one of: inserting a label on the image of the first participant or a graphical icon on the image of the first participant, wherein the paused information comprises at least one of: the inserted label or the graphical icon on the image of the first participant.

7. The system according to claim 1, wherein the frozen image frame for display is selected by an artificial intelligence algorithm trained with a plurality of user selected images.

8. The system according to claim 1, wherein the virtual environment is a three-dimensional virtual environment, and the virtual meeting is at least one of: a videoconferencing meeting, a virtual audio-visual meeting in the three-dimensional virtual environment that is shared among the plurality of participants of the plurality of user devices, or an augmented reality-based virtual meeting.

9. The system according to claim 1, wherein the processor is further configured to:
remove a background of each participant of the plurality of participants from a corresponding video feed captured at each of the plurality of user devices; and
merge a video cut-out of each participant of the plurality of participants devoid of their background in the virtual environment.

10. The system according to claim 1, wherein the first set of components comprises two or more of the audio capture component, an audio output component, and the image-capture component of the first user device, wherein at least the audio capture component and the image-capture component of the first user device are deactivated concomitantly based on the first user input on the pause user interface element.

11. The system according to claim 1, wherein the processor is further configured to, after controlling the first set of device functions, unsubscribe other user devices of the plurality of user devices in the virtual environment from the outgoing audio as well as the outgoing video feed from the first user device.

12. A method for controlling user interactions in a virtual meeting, the method comprising:
in a cloud server:
controlling display of a user interface on a plurality of user devices, wherein the user interface comprises a virtual environment to facilitate the virtual meeting among a plurality of participants of the plurality of user devices;
receiving a first user input corresponding to an activation of a pause user interface element on the user interface from a first user device of the plurality of user devices;
in response to the received first user input corresponding to the activation of the pause user interface element at the first user device,
(1) controlling a first set of device functions associated with a first set of components of the first user device engaged in the virtual meeting, and (2)
selecting a frozen image frame for display from a set of image frames previously captured by an image-capture component of the first user device during the virtual meeting and prior to the activation of the pause user interface element, wherein the frozen image frame for display is selected based on a user standard,
wherein the control of the first set of device functions comprises pausing an outgoing audio as well as an outgoing video feed concomitantly from the first user device, and
wherein the first set of components comprises an audio capture component and the image-capture component of the first user device;
causing the other user devices of the plurality of user devices to continue to interact in the virtual environment in the virtual meeting while the outgoing audio and the outgoing video feed from the first user device is selectively paused;
receive a second user input from the first user device subsequent to the receipt of the first user input to further activate the pause user interface element on the user interface; and
in response to the second user input,
(1) control a second set of device functions concomitant to the first set of device functions when the second user input is received subsequent to the receipt of the first user input, and
(2) the control of the second set of device functions comprises restricting incoming audio from the other user devices to be played at the first user device independent of muting corresponding audio capture components of the other user devices.

13. The method according to claim 12, wherein the controlling of the first set of device functions further comprises recording an audio-visual segment of the virtual environment of the virtual meeting for a first period corresponding to the activation of the pause user interface element until the pause user interface element is deactivated.

14. The method according to claim 13, further comprising causing the first user device to extract the recording of the audio-visual segment of the virtual environment of the virtual meeting for the first period for a user consumption at a second period different from the first period.

15. The method according to claim 12, wherein the controlling of the first set of device functions further comprises communicating a notification to the other devices of the plurality of user devices, wherein the notification comprises paused information that is indicative of the activation of the pause user interface element at the first user device in the virtual environment.

16. The method according to claim 12, further comprising, after controlling the first set of device functions, unsubscribing other user devices of the plurality of user devices in the virtual environment from the outgoing audio as well as the outgoing video feed from the first user device.

17. A non-transitory computer-readable medium having stored thereon computer-implemented instructions which, when executed by a computer, causes the computer to execute operations comprising:
- controlling display of a user interface on a plurality of user devices, wherein the user interface comprises a virtual environment to facilitate the virtual meeting among a plurality of participants of the plurality of user devices;
- receiving a first user input corresponding to an activation of a pause user interface element on the user interface from a first user device of the plurality of user devices;
- in response to the received first user input corresponding to the activation of the pause user interface element at the first user device,
    (1) controlling a first set of device functions associated with a first set of components of the first user device engaged in the virtual meeting, and
    (2) selecting a frozen image frame for display from a set of image frames previously captured by an image-capture component of the first user device during the virtual meeting and prior to the activation of the pause user interface element, wherein the frozen image frame for display is selected based on a user standard,
- wherein the control of the first set of device functions comprises pausing an outgoing audio as well as an outgoing video feed concomitantly from the first user device, and
- wherein the first set of components comprises an audio capture component and the image-capture component of the first user device;
- causing the other user devices of the plurality of user devices to continue to interact in the virtual environment in the virtual meeting while the outgoing audio and the outgoing video feed from the first user device is selectively paused;
- receive a second user input from the first user device subsequent to the receipt of the first user input to further activate the pause user interface element on the user interface; and
- in response to the second user input,
    (1) control a second set of device functions concomitant to the first set of device functions when the second user input is received subsequent to the receipt of the first user input, and
    (2) the control of the second set of device functions comprises restricting incoming audio from the other user devices to be played at the first user device independent of muting corresponding audio capture components of the other user devices.

* * * * *